United States Patent
Oyamada et al.

(10) Patent No.: US 12,086,853 B2
(45) Date of Patent: Sep. 10, 2024

(54) INTERMEDIARY DEVICE, CONTROL METHOD AND STORAGE MEDIUM

(71) Applicant: NEC Corporation, Tokyo (JP)

(72) Inventors: Masafumi Oyamada, Tokyo (JP); Keigo Kimura, Tokyo (JP); Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 17/441,793

(22) PCT Filed: Mar. 28, 2019

(86) PCT No.: PCT/JP2019/013756
§ 371 (c)(1),
(2) Date: Sep. 22, 2021

(87) PCT Pub. No.: WO2020/194701
PCT Pub. Date: Oct. 1, 2020

(65) Prior Publication Data
US 2022/0164842 A1  May 26, 2022

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0613* (2013.01); *G06Q 30/0201* (2013.01); *G06Q 30/0206* (2013.01)

(58) Field of Classification Search
CPC .............................................. G06Q 30/06–08
See application file for complete search history.

(56) References Cited

U.S. PATENT DOCUMENTS

| | | |
|---|---|---|
| 2006/0218120 A1 | 9/2006 | Juang |
| 2007/0038524 A1 | 2/2007 | Fiechter et al. |
| 2012/0203708 A1* | 8/2012 | Psota .......... G06Q 30/02 705/347 |
| 2014/0379509 A1 | 12/2014 | Sasa |
| 2017/0359321 A1* | 12/2017 | Rindal .......... G06F 21/602 |
| 2019/0057441 A1* | 2/2019 | Dahake .......... G06Q 40/04 |

FOREIGN PATENT DOCUMENTS

| | | |
|---|---|---|
| JP | 2001-319093 A | 11/2001 |
| JP | 2006-277719 A | 10/2006 |
| JP | 2009-505238 A | 2/2009 |
| JP | 2015-144010 A | 8/2015 |

OTHER PUBLICATIONS

International Search Report for PCT Application No. PCT/JP2019/013756, mailed on Jun. 25, 2019.

* cited by examiner

*Primary Examiner* — Ethan D Civan

(57) ABSTRACT

The acquisition unit 52B acquires sales request information S1, which is request information regarding a sale of data owned by a data owner, from an owner terminal 2 used by the data owner. The determination unit 53B determines, on a basis of the sales request information S1, whether or not there is a customer who demands the data. The notification unit 54B notifies, in a case where the determination unit 53B determines that there is the customer, the owner terminal 2 of sales response information S2 indicating information regarding the customer for the data.

10 Claims, 10 Drawing Sheets

INTERMEDIARY DEVICE, CONTROL METHOD AND STORAGE MEDIUM

This application is a National Stage Entry of PCT/JP2019/013756 filed on Mar. 28, 2019, the contents of all of which are incorporated herein by reference, in their entirety.

TECHNICAL FIELD

The present invention relates to a technical field of an intermediary device, a control method, and a storage medium for mediating the purchase and sale of data.

BACKGROUND ART

An intermediary system is known to mediate between sellers and buyers through a communication network. For example, Patent Literature 1 discloses an intermediary system configured to display to the seller the order information excluding the identification information of the buyer and then display to the buyer a list of bidding information the seller has entered in response to the order information.

PRIOR ART DOCUMENTS

Patent Literature

Patent Literature 1: JP 2001-319093A

SUMMARY OF THE INVENTION

Problem to be Solved by the Invention

In some cases, a data owner who collects and manages the data cannot appropriately utilize its owned data. Such data can be data needed for others. On the other hand, although the buyer informs the intermediary device of the ordering information specifying the target to be purchased by the buyer according to Patent Literature 1, Patent Literature 1 is silent on the approach for mediation in such a case that seller informs the intermediary device of the target to be sold or a case that other than the service is the target of deal.

In view of the above-described issues, it is therefore an example object of the present disclosure to provide an intermediary device, a control method and a storage medium capable of suitably performing the mediation when the data is to be traded.

Means for Solving the Problem

One mode of the intermediary device is an intermediary device including: an acquisition unit configured to acquire request information regarding a sale of data owned by a data owner from an owner terminal used by the data owner; a determination unit configured to determine, on a basis of the request information, whether or not there is a customer who demands the data; and a notification unit configured to notify, in a case where the determination unit determines that there is the customer, the owner terminal of information regarding the customer.

One mode of the control method is a control method executed by an intermediary device, the control method including: acquiring request information regarding a sale of data owned by a data owner from an owner terminal used by the data owner; determining, on a basis of the request information, whether or not there is a customer who demands the data; and notifying, in a case where it is determined that there is the customer, the owner terminal of information regarding the customer.

One mode of the storage medium is a storage medium storing a program executed by a computer, the program causing the computer to function as: an acquisition unit configured to acquire request information regarding a sale of data owned by a data owner from an owner terminal used by the data owner; a determination unit configured to determine, on a basis of the request information, whether or not there is a customer who demands the data; and a notification unit configured to notify, in a case where the determination unit determines that there is the customer, the owner terminal of information regarding the customer.

Effect of the Invention

An example advantage according to the present invention is to suitably notify, when the data is to be traded, the data owner of information regarding a customer who demands the data to thereby favorably mediate the data trades.

DESCRIPTION OF EXAMPLE EMBODIMENTS

Hereinafter, with reference to the drawings, example embodiments relating to an intermediary device, a control method and a storage medium will be described.

First Example Embodiment (1-1) Configuration of Data Market System

Figure 1:
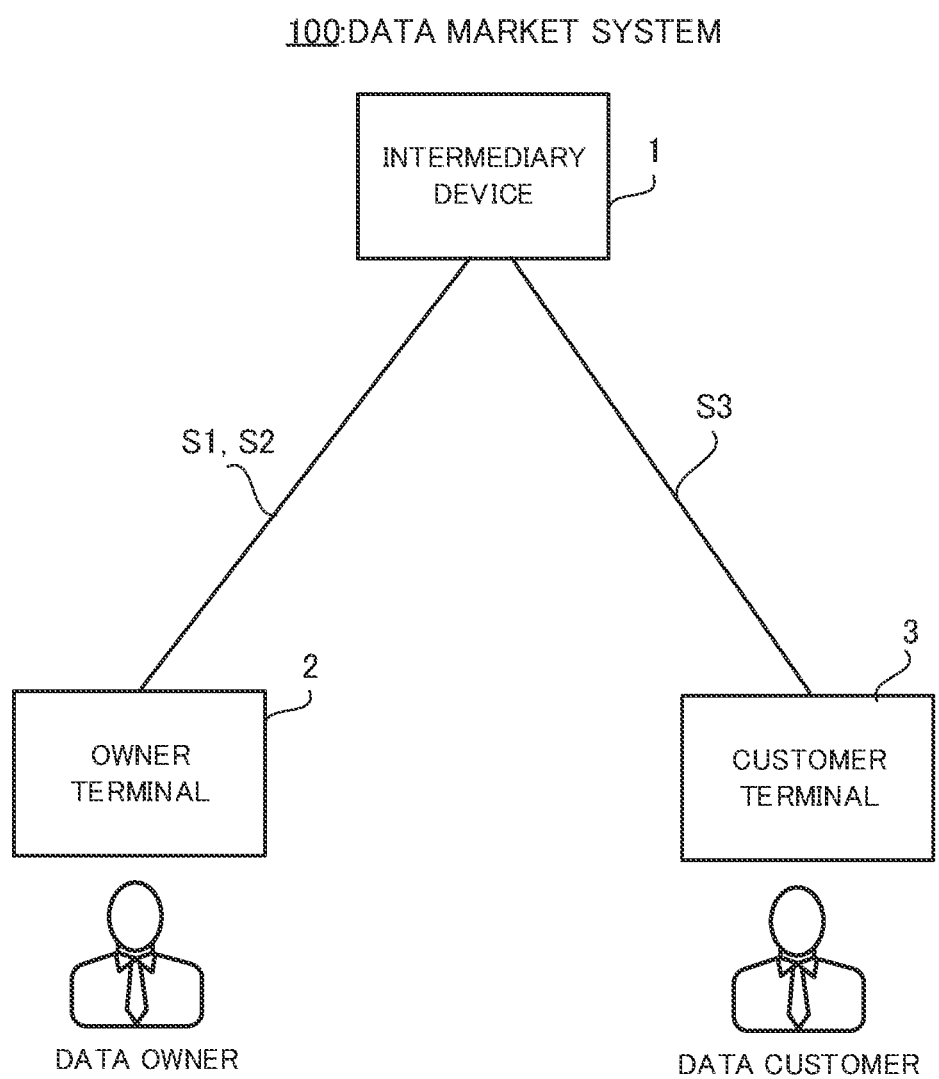
FIG. 1 illustrates a configuration of a data market system according to a first example embodiment.

FIG. 1 illustrates a configuration of a data market system 100 according to the first example embodiment. The data market system 100 mainly includes an intermediary device 1, an owner terminal 2 used by a data owner who wishes to sell its own data and a customer terminal 3 used by a data customer who wishes to purchase data. Data communication via a communication network or the like is performed between the intermediary device 1 and the owner terminal 2 and between the intermediary device 1 and the customer terminal 3, respectively. Though there are only present one owner terminal 2 and one customer terminal 3 in FIG. 1, a plurality of owner terminals 2 and a plurality of customer terminals 3 may be present, respectively. In addition, the terms "data owner" and "data customer" shall include not only individuals but also organizations such as companies.

The intermediary device 1 performs processing relating to the mediation of the purchase and sale of data. Specifically, when the intermediary device 1 receives request information (also referred to as "sales request information S1") relating to the sale of data from the owner terminal 2, the intermediary device 1 determines whether or not there is a customer who demands data (also referred to as "sales target data") designated as the target of sale by the sales request information S1. Then, the intermediary device 1 transmits response information (also referred to as "sales response information S2") including information regarding the customer(s) that demand the sales target data to the owner terminal 2. Further, the intermediary device 1 receives information (also referred to as "purchase request information S3") relating to the purchase desire of the data from the customer terminal 3 used by the data customer.

It is noted that provided that there is a data customer who demands the sales target data indicated by the sales request information S1 and the sales contract is made through an agreement of various purchase conditions including the price, the intermediary device 1 transmits the sales target data to the customer terminal 3 used by the data customer. In this case, the intermediary device 1 processes the money transaction in connection with the trade of the sales target data between the data owner and the data customer.

The owner terminal 2 generates the sales request information S1 relating to the sales target data designated by the data owner, and transmits the sales request information S1 to the intermediary device 1. The sales request information S1 may include the sales target data itself or may include information (i.e., metadata) for specifying the sales target data in place of the sales target data itself. Further, when the owner terminal 2 receives the sales response information S2 from the intermediary device 1 as a response of the sales request information S1, the owner terminal 2 displays information based on the sales response information S2. The display example based on the sales response information S2 will be described later.

The customer terminal 3 generates the purchase request information S3 relating to the data designated by the data customer as the data which the data customer intends to purchase, and transmits the purchase request information S3 to the intermediary device 1. Here, for example, the data customer of the customer terminal 3 designates, as the data which the data customer intends to purchase, data necessary for performing a planned task or data necessary for improving the accuracy of the planned task. Examples of the task described above includes a demand analysis of commodities, an analysis of cancellation of insurance products and process relating to any of various kinds of data analysis.

(1-2) Device Configuration

Next, the respective configurations of the intermediary device 1, the owner terminal 2 and the customer terminal 3 will be described with reference to FIGS. 2 to 4.

Figure 2:
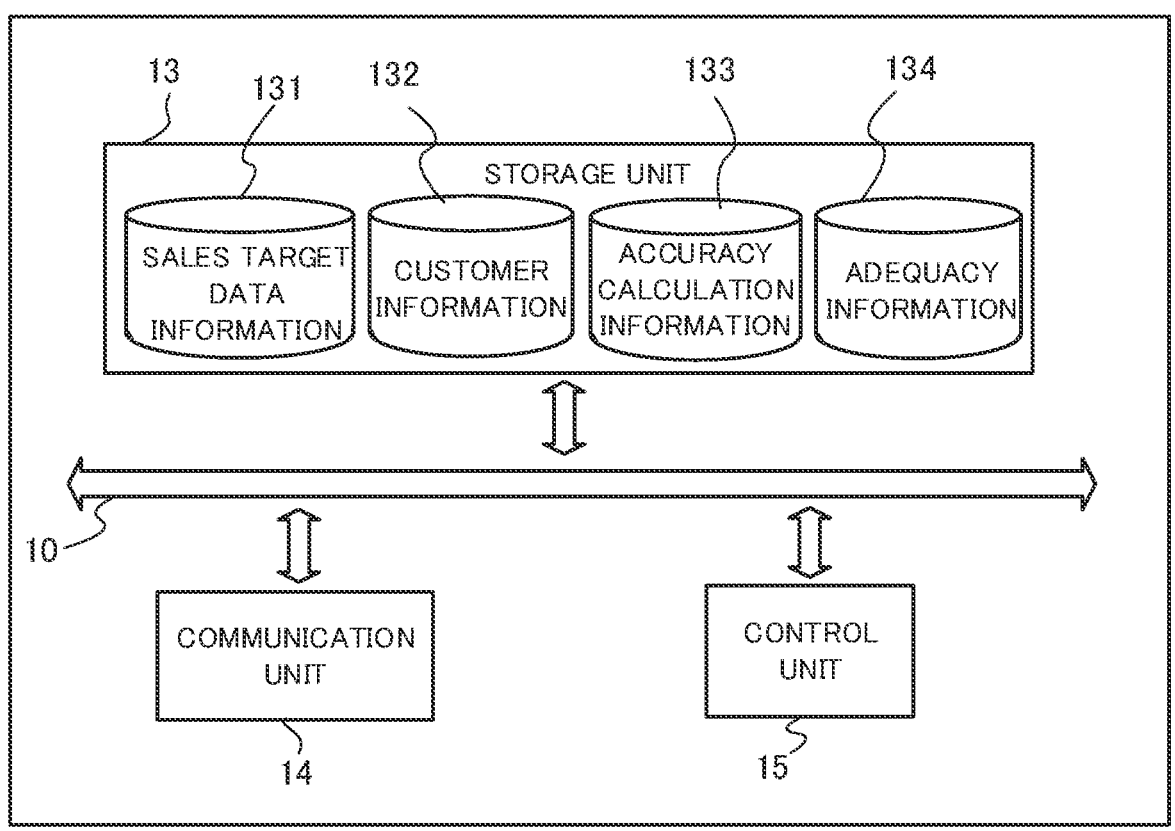
FIG. 2 illustrates a schematic configuration of an intermediary device.

FIG. 2 illustrates a schematic configuration of the intermediary device 1. The intermediary device 1 mainly includes a storage unit 13, a communication unit 14 for performing data communication and a control unit 15. Each of these elements is connected to one another via a bus line 10.

The control unit 15 includes a CPU, a ROM and a RAM which are not shown and performs various controls for each component in the intermediary device 1. The control unit 15 functions as a computer for executing a program. The process which the control unit 15 executes will be described later.

The storage unit 13 is configured by memories such as a hard disk and a flash memory. The storage unit 13 stores a program to be executed by the control unit 15, and the information necessary for the control unit 15 to execute a predetermined process by executing a program. The above-described program may be stored in any storage medium other than the storage unit 13.

Further, the storage unit 13 stores, for example, sales target data information 131, customer information 132, accuracy calculation information 133, and adequacy (suitability) information 134.

The sales target data information 131 is information relating to the sales target data and is generated based on the sales request information S1 received from the owner terminal 2.

The customer information 132 is information relating to the data customer corresponding to the customer terminal 3 that transmitted the purchase request information S3, and is generated based on the purchase request information S3 received from the customer terminal 3. It is noted that the purchase request information S3 may be transmitted from the customer terminal 3 to the intermediary device 1 through the user registration of the data customer to the data market system 100.

The accuracy calculation information 133 is information necessary for calculation of the accuracy of the task. For example, the accuracy calculation information 133 may be a correspondence table, for each task subjected to accuracy calculation, between candidates of the data combination to be used for the each task and the accuracy of the each task in a case where each of the candidates is used for the each task.

The adequacy information 134 is information to be used to determine the adequacy (suitability) as a buyer of the sales target data. For example, the adequacy information 134 includes information (also referred to as "reliability information") indicating the reliability of users, who include the data customer, of the data market system 100 and information (also referred to as "interest relationship information") indicating the interest relationship between the users.

For example, the reliability information indicates an index value of reliability. For example, the index value is determined in consideration of at least one of (or in comprehensive consideration of): past records of usage such as the number of times of trading data through the data market system 100 in the past; an evaluation from the other party at the time of trading data through the data market system 100 in the past; and information on the size of the company and/or whether or not the company is a listed company in a case where the user is a company. The interest relationship information may be information indicative of a combination of a data owner and a data customer with an interest relationship, or may be information indicative of a combination of attributes (e.g., industry type) of a data owner and a data customer that are estimated to have an interest relationship.

Figure 5:
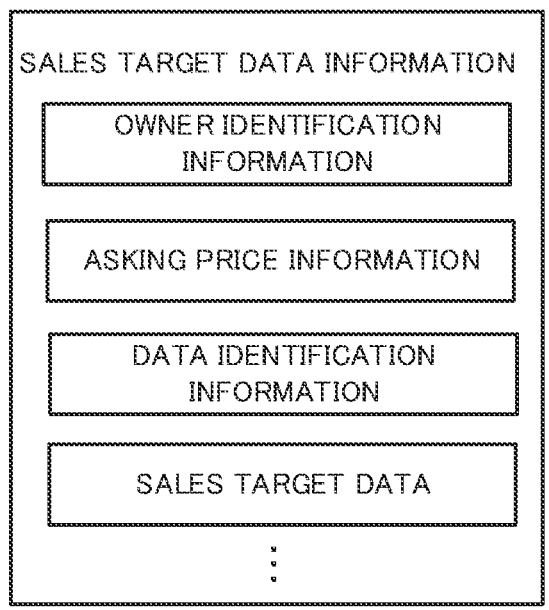
FIG. 5 illustrates an example of a data structure of sales target data information.
Figure 6:
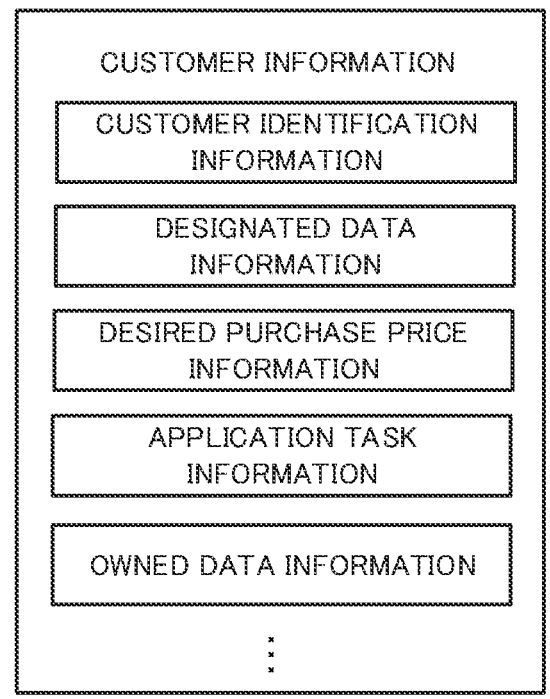
FIG. 6 illustrates an example of a data structure of customer information.

Referring now to FIGS. 5 and 6, an example of data structures of the sales target data information 131 and the customer information 132 will be described.

FIG. 5 is an example of a data structure of the sales target data information 131. For example, the sales target data information 131 is information generated for each sales request information S1 received from the owner terminal 2 and includes owner identification information, asking price information, data identification information and sales target data.

The "OWNER IDENTIFICATION INFORMATION" is information for identifying the owner of the sales target data (i.e., the data owner of the owner terminal 2). The owner identification information may include information regarding the attributes of the data owner such as the company name and the industry type. The "ASKING PRICE INFORMATION" is information indicating the asking price set by the data owner. The "DATA IDENTIFICATION INFORMATION" is information (metadata) for identifying the sales target data and includes information indicating various attributes of the sales target data such as the name or the type of the sales target data and the data size thereof. The "SALES TARGET DATA" indicates raw data of the sales target data.

The data structure of the sales target data information 131 is not limited to the example shown in FIG. 5. For example, the sales target data information 131 may not include "SALES TARGET DATA". In this case, for example, when the sale contract of the sales target data is established between the data owner and the data customer, the owner terminal 2 may directly transmit the sales target data to the customer terminal 3.

FIG. 6 is an example of a data structure of the customer information 132. The customer information 132 is, for example, information generated for each purchase request information S3 received from the customer terminal 3 and includes customer identification information, designated data information, desired purchase price information, application task information, and owned data information.

The "CUSTOMER IDENTIFICATION INFORMATION" is information that identifies the data customer. The "DESIGNATED DATA INFORMATION" is information that designates data (data type) which the data customer intends to purchase. The "DESIRED PURCHASE PRICE INFORMATION" is information indicating the price which the data customers desires. The "APPLICATION TASK INFORMATION" is information indicating a task to which the purchase target data (designated data) is to be applied. The "OWNED DATA INFORMATION" refers to information regarding data owned by the data customer. For example, the owned data information is the raw data of the data owned by the data customer or the metadata for identifying the type of the data (data type).

It is noted that the storage unit 13 may have any information other than the sales target data information 131, the customer information 132, the accuracy calculation information 133 and the adequacy information 134 described above. For example, the storage unit 13 may further include information regarding the usage records of the user of the data market system 100.

Figure 3:
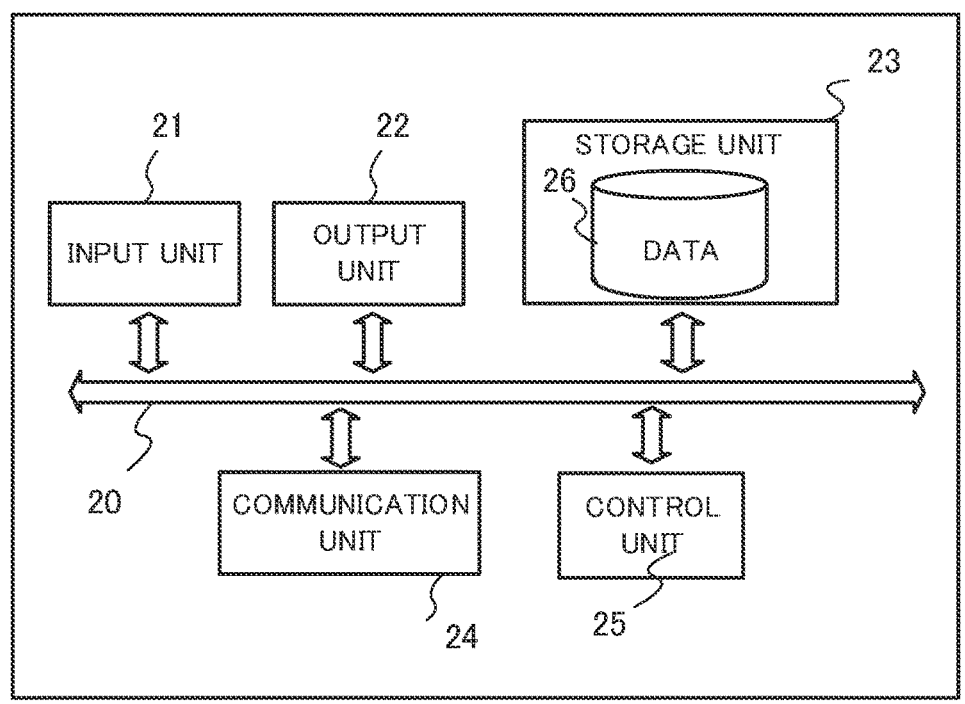
FIG. 3 illustrates a schematic configuration of an owner terminal used by a data owner.

FIG. 3 illustrates a schematic configuration of the owner terminal 2. The owner terminal 2 mainly includes an input unit 21, an output unit 22, a storage unit 23, a communication unit 24 for performing data communication and a control unit 25. Each of these elements is connected to each other via a bus line 20.

The input unit 21 is an interface that accepts an input by a user, and corresponds to, for example, a touch panel, a button, a voice input device or the like. The output unit 22 is an interface for outputting information to the user, such as a display for displaying information and a speaker for outputting sound.

The storage unit 23 is configured by memories such as a hard disk and a flash memory. The storage unit 23 stores a program to be executed by the control unit 25 and other information necessary for the control unit 25 to execute a predetermined process by executing a program. The storage unit 23 stores the data 26 including the sales target data.

The control unit 25 includes a CPU, a ROM and a RAM which are not shown, and performs various controls for each component of the owner terminal 2. For example, the control unit 25 generates the sales request information S1 relating to the data specified by the input unit 21, and transmits the sales request information S1 to the intermediary device 1 by the communication unit 24. Further, when the communication unit 24 receives the sales response information S2 from the intermediary device 1, the control unit 25 displays information based on the sales response information S2 by controlling the output unit 22.

Figure 4:
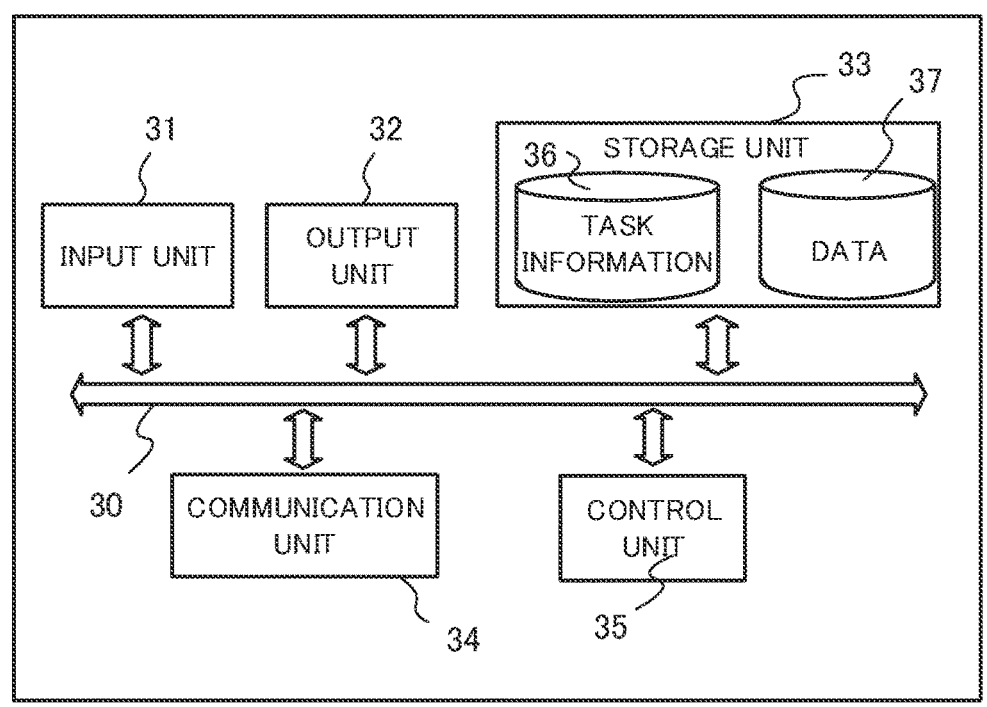
FIG. 4 illustrates a schematic configuration of a customer terminal used by a data customer.

FIG. 4 illustrates a schematic configuration of the customer terminal 3. The customer terminal 3 mainly includes an input unit 31, an output unit 32, a storage unit 33, a communication unit 34 for performing data communication and a control unit 35. Each of these elements is connected to one another via a bus line 30.

The input unit 31 is an interface that accepts an input of a user, and corresponds to, for example, a touch panel, a button, a voice input device or the like. The output unit 32 is an interface for outputting information to the user, such as a display for displaying information and a speaker for outputting sound.

The storage unit 33 is configured by memories such as a hard disk and a flash memory. The storage unit 33 stores a program to be executed by the control unit 35 and other information necessary for the control unit 35 to execute a predetermined process by executing a program. The storage unit 33 stores the task information 36 and the data 37. The task information 36 is information necessary for performing a task by the data customer who is the user of the customer terminal 3, and includes, for example, an execution program of a task such as an analysis engine and an analysis script. The data 37 is the data to be analyzed by the task described above.

The control unit 35 includes a CPU, a ROM and a RAM which are not shown, and performs various controls for each component in the customer terminal 3. For example, the control unit 35 generates the purchase request information S3 relating to the data specified by the input unit 31, and transmits it to the intermediary device 1 by the communication unit 34.

(1-3) Functional Block

Figure 7:
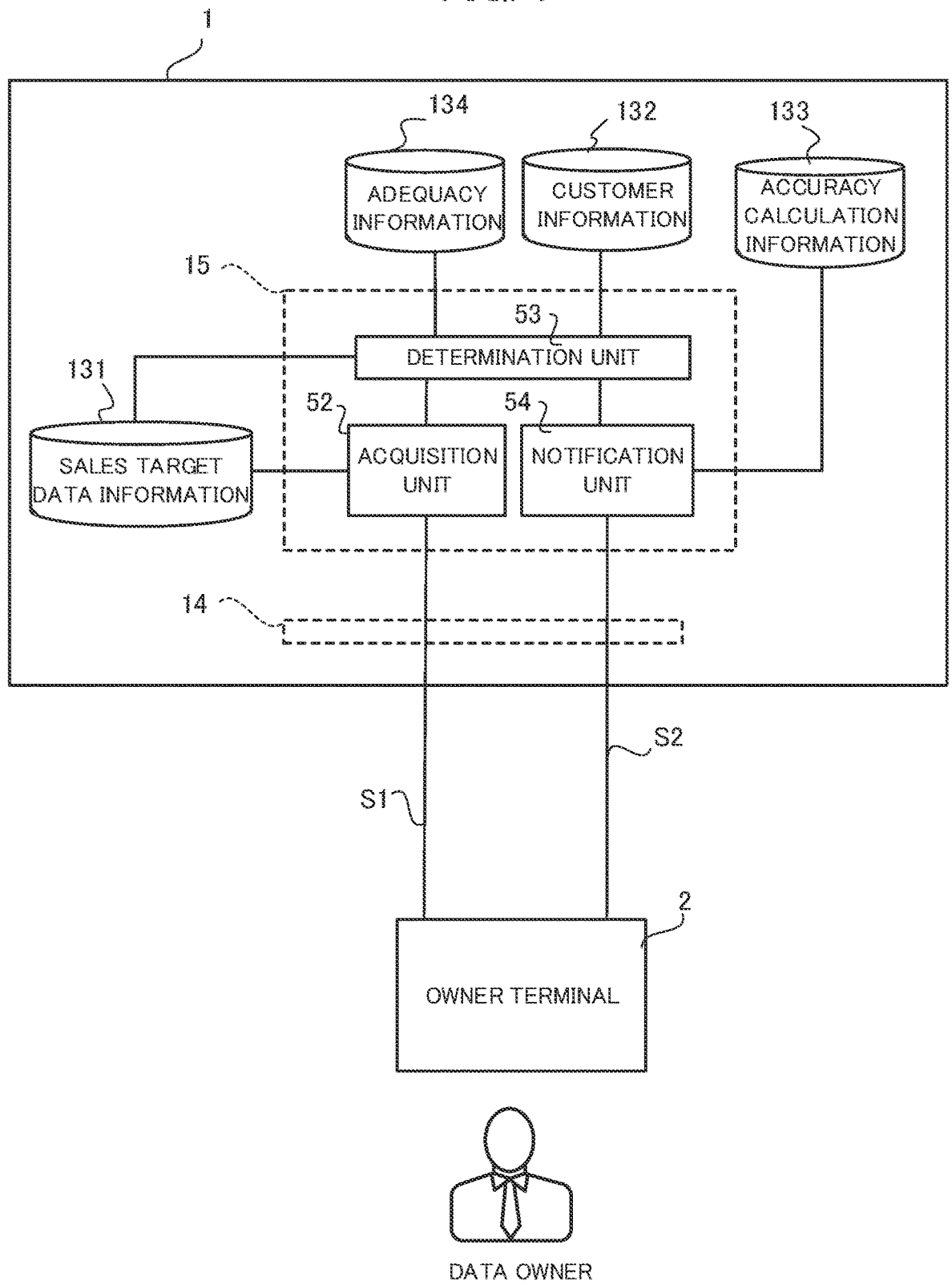
FIG. 7 illustrates an example of a functional block of the intermediary device.

FIG. 7 illustrates an example of a functional block of the intermediary device 1 with respect to the reception of the sales request information S1 and the transmission of the sales response information S2. The control unit 15 of the intermediary device 1 functionally includes an acquisition unit 52, a determination unit 53 and a notification unit 54.

The acquisition unit 52 receives the sales request information S1 via the communication unit 14 from the owner terminal 2. The acquisition unit 52 generates the sales target data information 131 based on the received sales request information S1, and stores the generated sales target data information 131 in the storage unit 13.

The determination unit 53 refers to the sales target data information 131 based on the sales request information S1 acquired by the acquisition unit 52 and the customer information 132 and thereby determines whether or not there is a customer who demands (desires) the sales target data specified by the sales request information S1. The customer information 132 is generated based on the purchase request information S3 transmitted from the customer terminal 3.

For example, when there is customer information 132 which includes the designated data information (see FIG. 6) indicating the same data (data type) as the data indicated by the data identification information (see FIG. 5) of the sales target data information 131, the determination unit 53 determines that the data customer indicated by the customer identification information of the customer information 132 is the data customer who demands the sales target data.

In this case, preferably, the determination unit 53 may determines the data customer who demands the sales target data by further comparing the asking price indicated by the asking price information (see FIG. 5) of the sales target data information 131 with the desired purchase price indicated by the desired purchase price information (see FIG. 6) of the customer information 132. Specifically, if the asking price is equal to or smaller than the desired purchase price or the difference between the asking price and the desired purchase price is less than a predetermined difference (e.g., a predetermined ratio of the asking price), the determination unit 53 determines that the data customer who demands the sales target data is the data customer indicated by the customer identification information of the customer information 132.

When the determination unit 53 determines that there is a data customer who demands the sales target data, the determination unit 53 further determines, by referring to the adequacy information 134, whether or not the data customer who demands the sales target data has the adequacy (is suitable) as a buyer of the sales target data.

Specifically, the determination unit 53 refers to the reliability information of the adequacy information 134 and thereby determines whether or not the data customer who demands the sales target data has the reliability. For example, in a case that the reliability information is represented by index value, the determination unit 53 determines whether or not the index value is equal to or larger than a predetermined threshold thereby to determine whether or not the data customer who demands the sales target data has the reliability. Further, the determination unit 53 refers to the interest relationship information of the customer information 132 and thereby determines whether or not there is the interest relationship (e.g., interest relationship such as being competitors) between the corresponding data customer and the data owner that is the provider of the sales target data.

Then, if the data customer who demands the sales target data has the reliability and there is no such an interest relationship between the above-mentioned data customer and the data owner of the sales target data, the determination unit 53 determines that the data customer who demands the sales target data has the adequacy as a buyer of the sales target data. Hereinafter, the data customer who demands the sales target data and who has the adequacy as the buyer of the sales target data is referred to as "applicable data customer". In other words, the applicable data customer refers to the target data customer to be notified to the owner terminal 2 by the notification unit 54.

Then, the determination unit 53 supplies the customer information 132 relating to the applicable data customer to the notification unit 54. It is noted that the determination unit 53 supplies information indicating that there is no applicable data customer to the notification unit 54 when it is determined that there is no applicable data customer for the sales target data.

The notification unit 54 generates the sales response information S2 based on the determination result generated by the determination unit 53 and then transmits the sales response information S2 to the owner terminal 2 via the communication unit 14. In this case, the notification unit 54 generates a list (also referred to as "customer list Ld") relating to the applicable data customer(s) based on the customer information 132 of the applicable data customer(s) supplied from the determination unit 53.

At the time of generating the customer list Ld, the notification unit 54 refers to the customer information 132 and the accuracy calculation information 133 and thereby calculates an increase in accuracy in a case where the sales target data is additionally used for the task to be performed by the applicable data customer. Then, the notification unit 54 includes the information regarding the calculated accuracy in the customer list Ld. The above-mentioned "increase in accuracy" corresponds to the difference between the analytical accuracy in a case where the sales target data is additionally used for the target task and the analytical accuracy in a case where the sales target data is not additionally used for the target task. For example, the notification unit 54 calculates the accuracy on the assumption that only the data indicated by the owned data information is used for the target task and the accuracy on the assumption that both the data indicated by the owned data information and the sales target data are used for the task, respectively. Then, the notification unit 54 calculates the difference between these accuracies as the above-described "increase in accuracy".

Then, the notification unit 54 transmits, as the sales response information S2, display information for displaying a view (also referred to as "customer list view") of the customer list Ld to the owner terminal 2. The display example of the customer list view will be described later. It is noted that if the notification unit 54 receives the determination information indicating that there is no corresponding customer from the determination unit 53, the notification unit 54 transmits display information for displaying the information, which indicates that there is no corresponding customer, as the sales response information S2 to the owner terminal 2.

(1-4) Display Example

Figure 8:
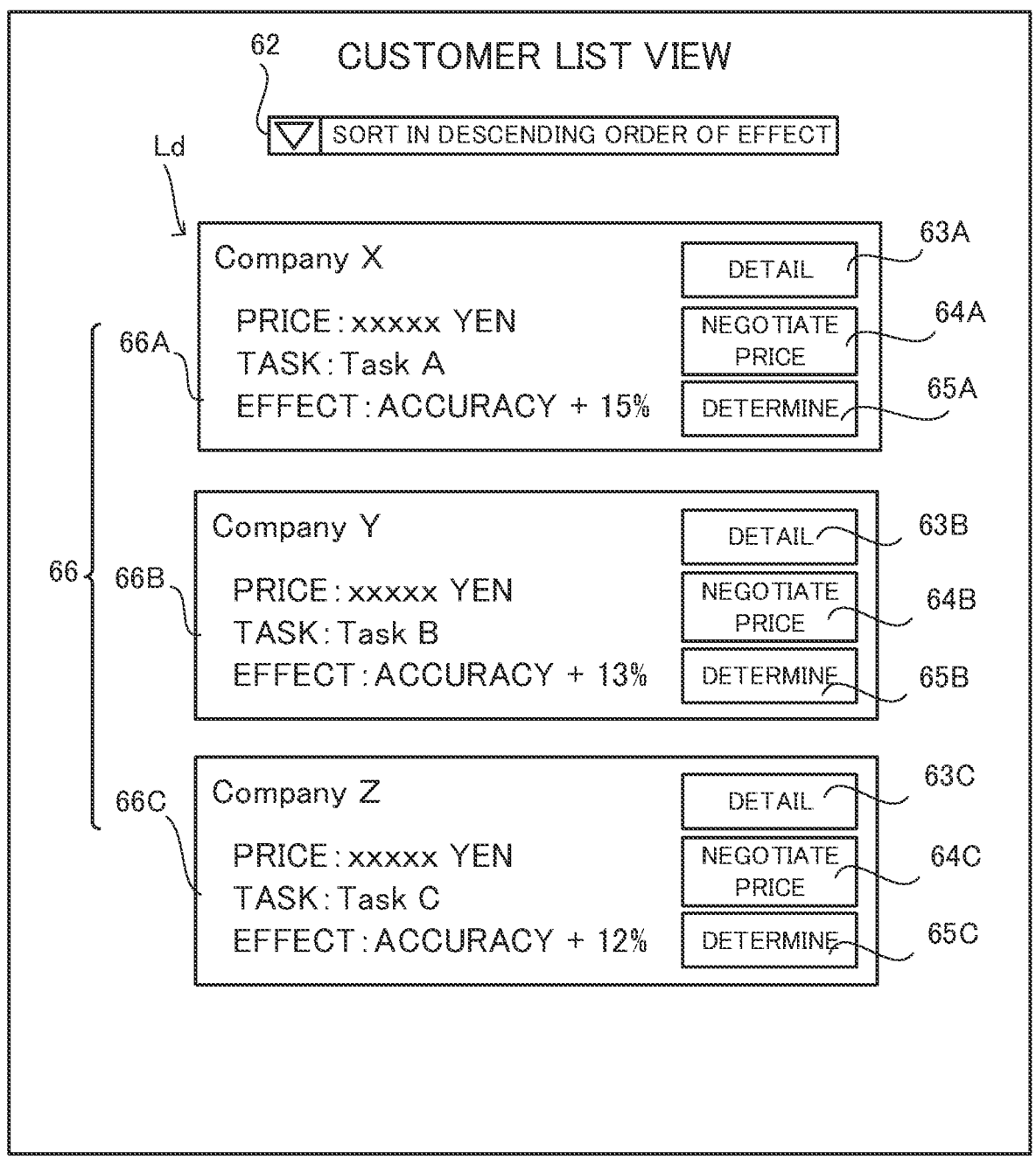
FIG. 8 illustrates an example of the display of a customer list view.

FIG. 8 is a display example of a customer list view displayed by the owner terminal 2 based on the sales response information S2. As shown in FIG. 8, the notification unit 54 of the intermediary device 1 displays the customer list Ld and a sort selection field 62 on the customer list view.

The customer list Ld includes the customer display fields 66 (66A to 66C) each showing the information associated with each applicable data customer. The customer display fields 66 are display fields each showing the information associated with each applicable data customer. Here, each of the customer display fields 66 includes respective display areas for displaying the price, the task and the effect (effectiveness), a detail button 63 (63A to 63C), a price negotiation button 64 (64A to 64C), and a decision button 65 (65A to 65C).

For example, on the basis of the desired purchase price information included in the target customer information 132, the notification unit 54 displays, as the "PRICE" to be displayed on the customer display field 66, the desired purchase price set by the applicable data customer. It is noted that, in place of the desired purchase value set by the applicable data customer, the intermediary device 1 may display, as the price described above, a recommended price based on the desired purchase price and the asking price set by the data owner.

Further, on the basis of the application task information of the customer information, the notification unit 54 displays, as the "TASK" to be displayed on the customer display field 66, a task to be performed by the applicable data customer.

Furthermore, the notification unit 54 displays, as the "EFFECT" to be displayed on the customer display field 66, the increased ratio in the accuracy to be caused by additionally using the sales target data for the task that is to be performed by the applicable data customer.

Further, the detail button 63 is a button for instructing the display of the detailed information regarding the applicable data customer. When detecting the selection of the detail button 63, the notification unit 54 transmits the display information for displaying a view including: the past business records of the applicable data customer in the data market system 100; the reliability information of the applicable data customer; and/or the general profile information of the applicable data customer, as the detailed information regarding the applicable data customer to the owner terminal 2.

The price negotiation button 64 is a button instructing the start of the price negotiation with the applicable data customer. For example, when the notification unit 54 detects the selection of the price negotiation button 64, the notification unit 54 transmits, to the owner terminal 2, the display information for displaying a price negotiation view which accepts the input of a message to the applicable data customer and selling price to be newly presented to the applicable user.

The determination button 65 is a button instructing to proceed with the trade while regarding the applicable data customer as the buyer. For example, when the notification unit 54 detects the selection of the decision button 65, the notification unit 54 transmits to the owner terminal 2 the display information for displaying a view including an input field to accept an input necessary to sell the sales target data to the applicable data customer. Further, the notification unit 54 notifies the customer terminal 3 which the applicable data customer uses of information indicating that there is a designation from the data owner.

The sort selection field 62 is a selection field for specifying how to determine the order of arrangement of the customer display fields 66A to 66C in the customer list Ld. Here, as an example, the sort selection field 62 is a pull-down menu selection field, and the item "SORT IN DESCENDING ORDER OF EFFECT" is selected therein according to FIG. 8. In this case, the notification unit 54 arranges and displays the customer display fields 66A to 66C in descending order of the degree of the effect (effectiveness). The sort selection field 62 may includes any selection items such as an item "SORT IN DESCENDING ORDER OF PRICE" and an item "SORT IN DESCENDING ORDER OF NUMBER OF PAST RECORDS" in addition to the item "SORT IN DESCENDING ORDER OF EFFECT". For example, if the item "SORT IN DESCENDING ORDER OF NUMBER OF PAST RECORDS" is selected, the notification unit 54 displays the customer display fields 66 in descending order of the number of transactions (the trade records) in the data market system 100 in the past with respect to each of the applicable data customers corresponding to the customer display fields 66.

(1-5) Process Flow

Figure 9:
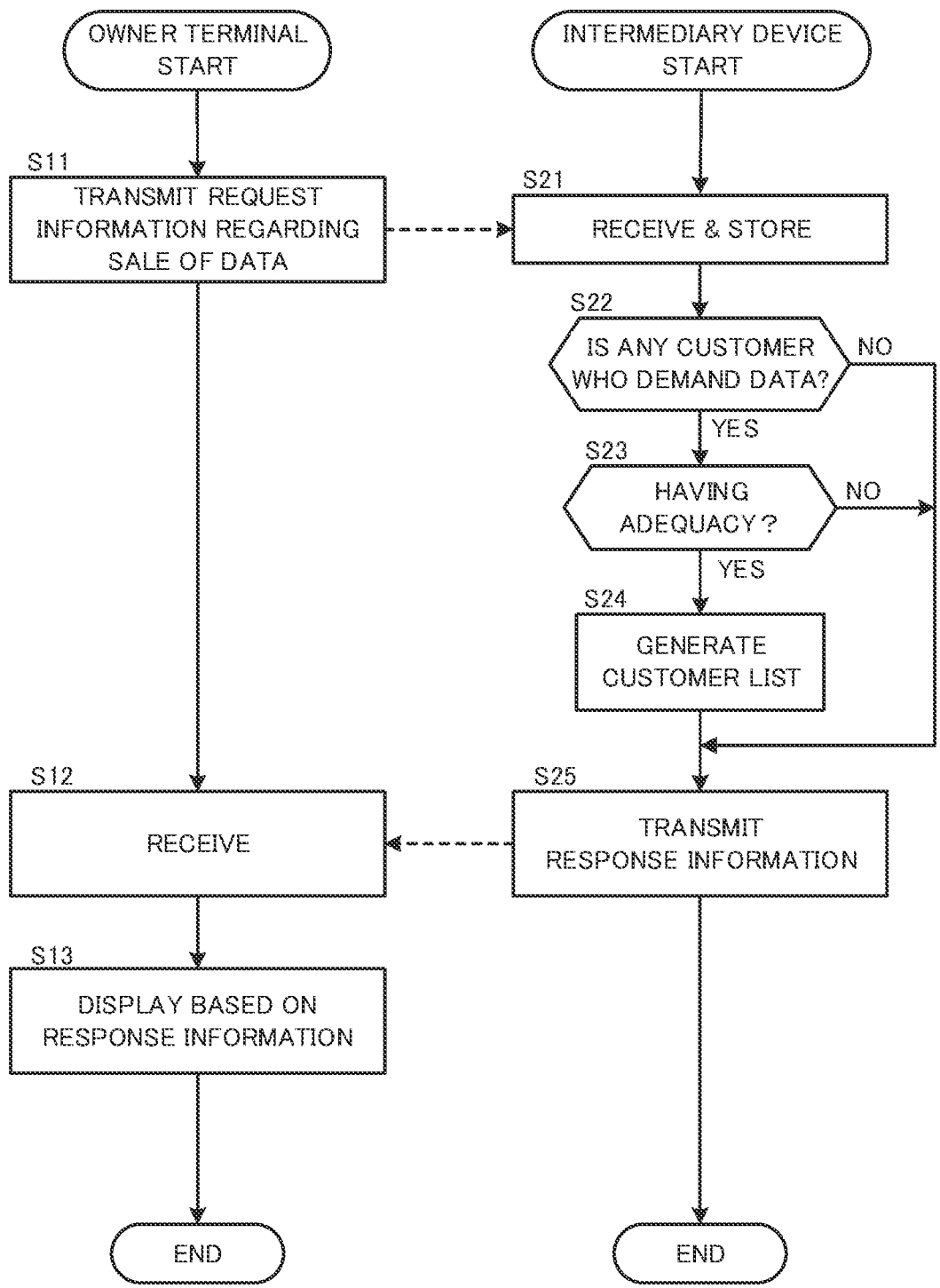
FIG. 9 illustrates an example of a flowchart according to the first example embodiment.

FIG. 9 is an example of a flowchart showing the processing procedure executed by the intermediary device 1 and the owner terminal 2 according to the first example embodiment.

First, when the owner terminal 2 detects the input relating to the sale of the sales target data by the input unit 21, the owner terminal 2 generates the sales request information S1 relating to the sale of the designated sales target data, and transmits the sales request information S1 to the intermediary device 1 (step S11).

The intermediary device 1 receives the sales request information S1 from the owner terminal 2 and then stores the sales target data information 131 based on the sales request information S1 (step S21). Then, the intermediary device 1 refers to the customer information 132 and thereby determines whether or not there is a customer who demands the sales target data specified by the sales request information S1 (step S22). Then, when there is a customer who demands the sales target data (step S22; YES), the intermediary device 1 determines whether or not the data customer who demands the sales target data has the adequacy (suitability) as a buyer of the sales target data (step S23).

Then, when the data customer who demands the sales target data has the adequacy as a buyer of the sales target data (step S23; YES), the intermediary device 1 determines that the customer who demands the sale target data is an applicable data customer. Therefore, in this case, the intermediary device 1 generates the customer list Ld based on the customer information 132 of the applicable data customer(s) (step S24). Further, the intermediary device 1 refers to the accuracy calculation information 133 and thereby performs calculation processing relating to the increase or decrease in the accuracy necessary for the display of the customer list Ld. After generating the customer list Ld, the intermediary device 1 transmits the sales response information S2, which includes the display information for displaying the customer list view, to the owner terminal 2 (step S25).

On the other hand, when there is no corresponding data customer who demands the sales target data (Step S22; NO), or when the data customer who demands the sales target data does not have the adequacy as a buyer of the sales target data (step S23; NO), the intermediary device 1 determines that there is no applicable data customer. In this case, the intermediary device 1 transmits the sales response information S2, which includes the display information indicating that there is no applicable data customer, to the owner terminal 2 (step S25).

After the transmission of the sales request information S1 at step S11, the owner terminal 2 receives the sales response information S2 from the intermediary device 1 as a response of the sales request information S1 (step S12). Then, the owner terminal 2 displays information based on the received sales response information S2 by controlling the output unit 22 (step S13).

Thus, according to the first example embodiment, when the intermediary device 1 receives the sales request information S1 that specifies the sales target data from the owner terminal 2, the intermediary device 1 generates the customer list Ld for the sales target data thereby to present the customer list Ld to the data owner. This allows the data owner to suitably select the buyer of the sales target data. Further, the intermediary device 1 includes information regarding the price, the effect, the tasks to be performed and usage records in the information on the applicable data customer, which suitably supports the data owner to select the buyer of the sales target data.

Second Example Embodiment

Figure 10:
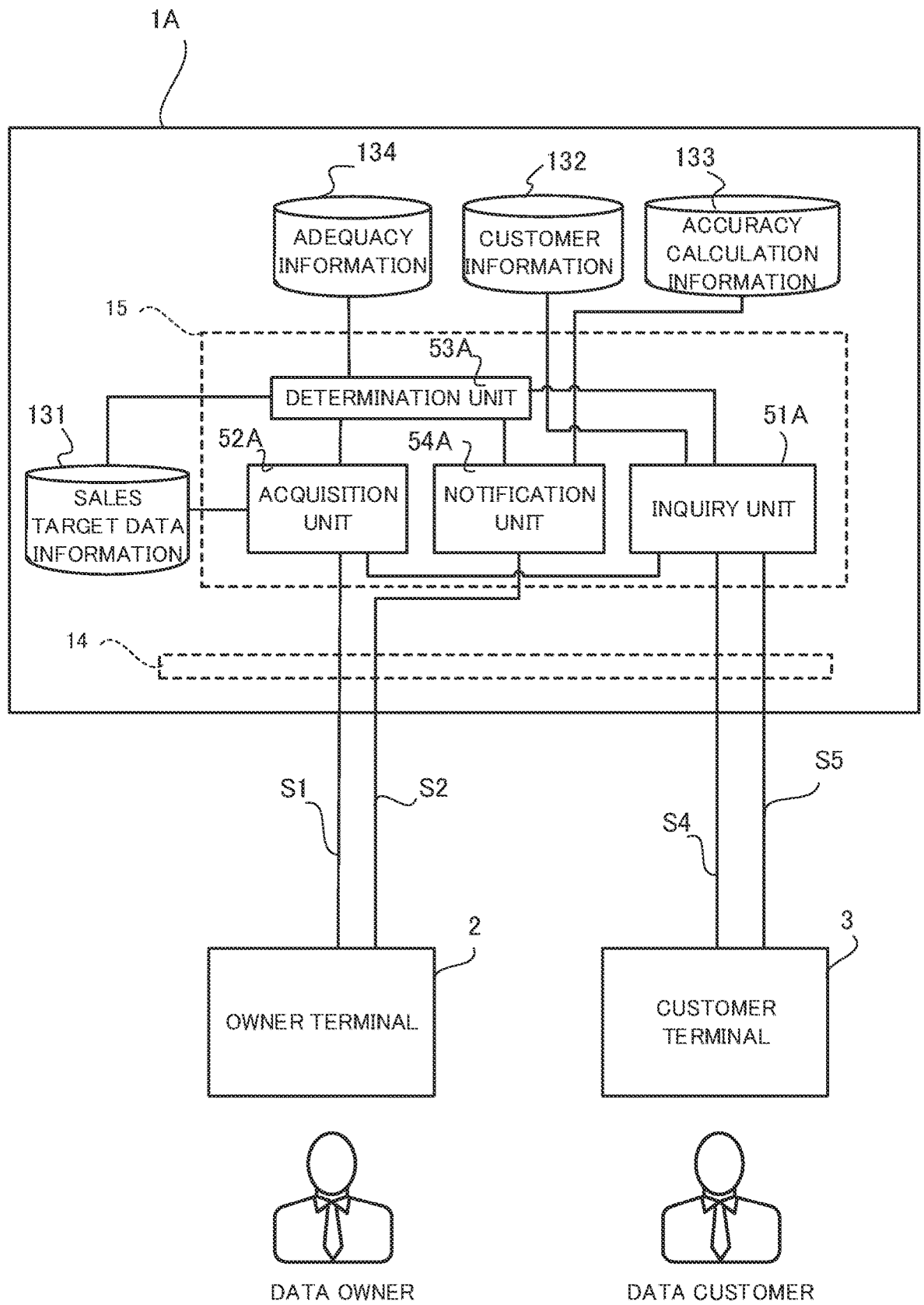
FIG. 10 illustrates a functional block diagram of the intermediary device according to a second example embodiment.

FIG. 10 illustrates a functional block diagram of the intermediary device 1A according to the second example embodiment. The intermediary device 1A according to the second example embodiment notifies the customer terminal 3 that there is sales target data for sale, and determines the applicable data customer based on the response thereof.

Specifically, the control unit 15 of the intermediary device 1A according to the second example embodiment functionally includes an inquiry unit 51A, an acquisition unit 52A, a determination unit 53A and a notification unit 54A.

When the acquisition unit 52A receives the sales request information S1 from the owner terminal 2, the acquisition unit 52A supplies the received sales request information S1 to the inquiry unit 51A. Then, the inquiry unit 51A transmits inquiry information "S4" regarding the purchase intention of the sales target data, which is specified by the sales request information S1, to the customer terminal 3 corresponding to the data customer registered in the customer information 132.

In this case, the customer information 132 is not limited to the information generated based on the purchase request information S3 which the customer terminal 3 transmits to the intermediary device 1A. Instead, the customer information 132 may be the information regarding users generated through the process of the user registration or the like in the data market system 100. The customer information 132 includes information on a communication address for transmitting the inquiry information S4 to the customer terminal 3.

when the inquiry unit 51A receives inquiry response information "S5" that indicates the intention to purchase the sales target data from the customer terminal 3 as a response to the inquiry information S4, the inquiry unit 51A supplies the received inquiry response information S5 to the determination unit 53A. The determination unit 53A determines whether or not the data customer that is the transmission source of the supplied query response information S5 is suitable (has the adequacy) as a buyer of the sales target data with reference to the adequacy information 134. Then, the notification unit 54A notifies, through the sales response information S2, the owner terminal 2 of the information relating to the data customer that the determination unit 53A has determined as the applicable data customer. For example, the notification unit 54A notifies, through the sales response information S2, the owner terminal 2 of the information (e.g., price, task and effect) displayed in the customer display field 66 in FIG. 8 as information relating to the applicable data customer. In this case, in the same way as the notification unit 54 according to the first example embodiment, the notification unit 54A calculates the increase in the accuracy in a case where the sales target data is applied to the task, that is to be performed by the applicable data customer, with reference to the accuracy calculation information 133.

Figure 11:
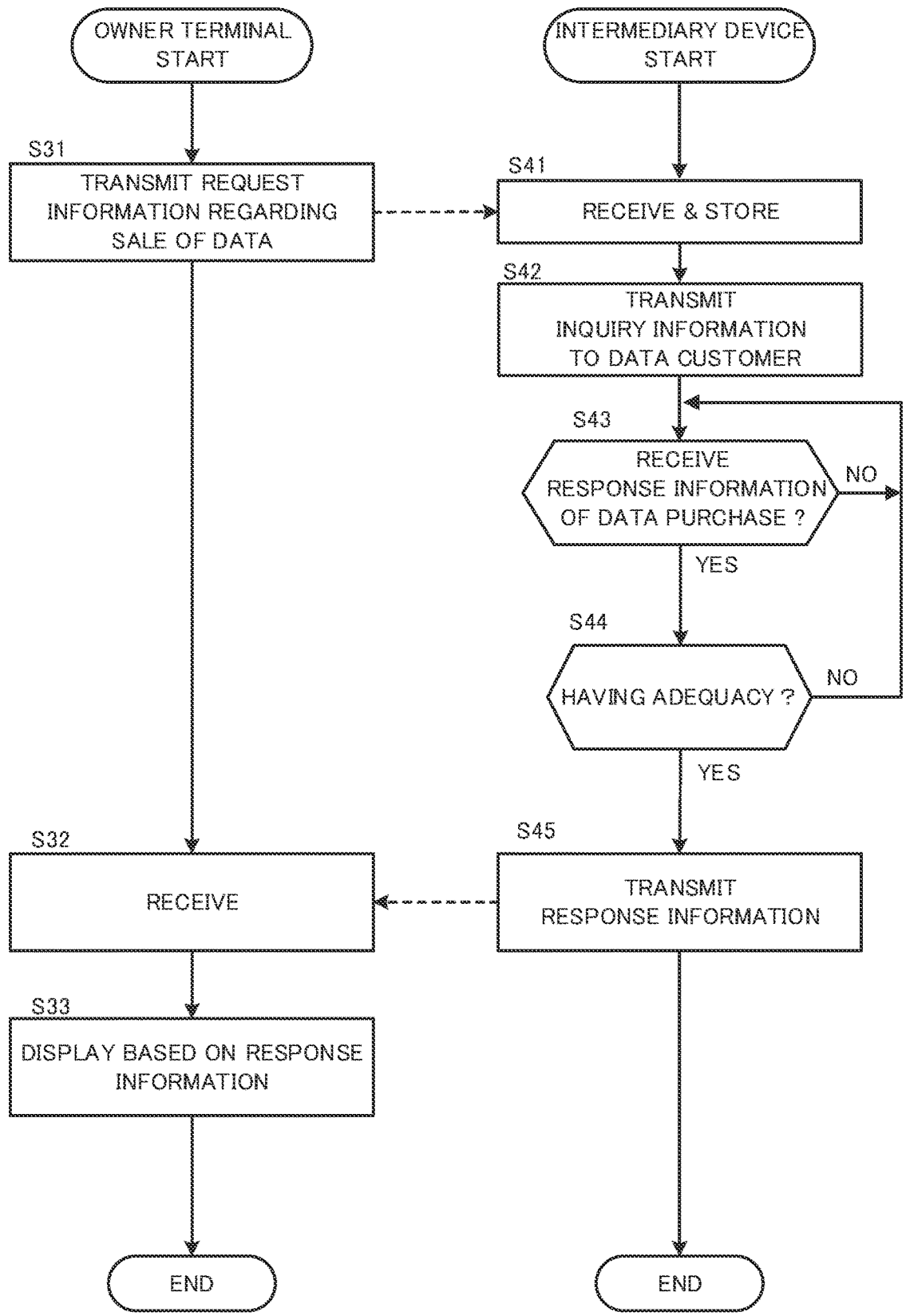
FIG. 11 illustrates an example of a flowchart according to the second example embodiment.

FIG. 11 is an exemplary flow chart illustrating the process procedure executed by the intermediary device 1A and the owner terminal 2 according to the second example embodiment.

First, when detecting the input relating to the sale of the sales target data by the input unit 21, the owner terminal 2 generates the sales request information S1 relating to the sale of the designated sales target data and transmits the sales request information S1 to the intermediary device 1A (step S31).

The intermediary device 1A receives the sales request information S1 from the owner terminal 2 and stores the sales target data information 131 generated based on the sales request information S1 (step S41). Next, the intermediary device 1A transmits the query information S4 regarding the sales target data specified by the sales request information S1 to the customer terminal 3 corresponding to the data customer registered in the customer information 132 (step S42). The intermediary device 1A determines whether or not the inquiry response information S5 indicating the purchase request of the sales target data has been received as the response of the inquiry information S4 (step S43). Then, when the intermediary device 1A receives the inquiry response information S5 indicating the purchase request of the sales target data (step S43; YES), the process proceeds to step S44.

At step S44, the intermediary device 1A refers to the adequacy information 134 and thereby determines whether or not the data customer corresponding to the customer terminal 3 that is the transmission source of the inquiry response information S5 has the adequacy as a buyer of the sales target data (step S44). Then, when a data customer of the customer terminal 3 that is the transmission source of the inquiry response information S5 has the adequacy as a buyer of the target sales target data (step S44; YES), the intermediary device 1A determines that the data customer is a applicable data customer. Then, the intermediary device 1A transmits the sales response information S2, which includes the display information generated based on the customer information 132 corresponding to the applicable data customer, to the owner terminal 2 (step S45). In this case, for example, the intermediary device 1A generates the display information for displaying a customer view, which indicates the information relating to the applicable data customer, based on the customer information 132, and transmits the display information to the owner terminal 2 as the sales response information S2.

For example, the intermediary device 1A repeatedly executes the process at step S43 to step S45 until the intermediary device 1A receives the response from all the customer terminals 3 that are the transmission destinations of the inquiry information S4 transmitted at step S42, or until a predetermined time period from the time at step S42 has elapsed. In this case, at step S45, when there are a plurality of the applicable data customers for the same sales target data corresponding to the same sales request information S1, the intermediary device 1A may generate the customer list Ld corresponding to all the applicable data customers in the same manner as in the first example embodiment, and the display information may be included in the sales response information S2.

After transmitting the sales request information S1 at step S31, the owner terminal 2 receives the sales response information S2 from the intermediary device 1A as a response of the sales request information S1 (step S32). Then, the owner terminal 2 displays information based on the received sales response information S2 by controlling the output unit 22 (step S33).

Thus, even in the second example embodiment, when the intermediary device 1 receives the sales request information S1 which specifies the sales target data from the owner terminal 2, the intermediary device 1 can suitably notify the owner terminal 2 of the information regarding the applicable data customer for the sales target data.

Third Example Embodiment

Figure 12:
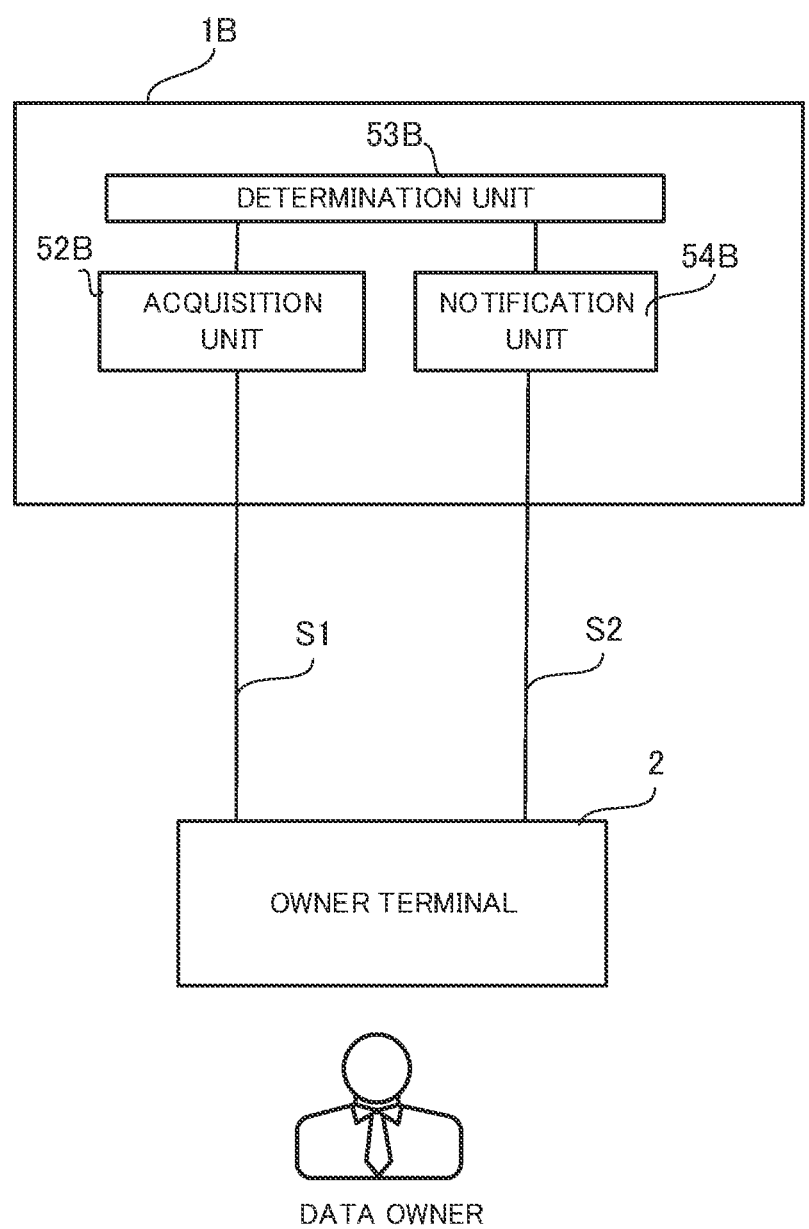
FIG. 12 illustrates a functional block diagram of the intermediary device according to a third example embodiment.

FIG. 12 is a functional block diagram of the intermediary device 1B according to a third example embodiment. The intermediary device 1B functionally includes an acquisition unit 52B, a determination unit 53B and a notification unit 54B.

The acquisition unit 52B acquires sales request information S1, which is request information regarding a sale of data owned by a data owner, from an owner terminal 2 used by the data owner. The determination unit 53B determines, on a basis of the sales request information S1, whether or not there is a customer who demands the data. The notification unit 54B notifies, in a case where the determination unit 53B determines that there is the customer, the owner terminal 2 of sales response information S2 indicating information regarding the customer for the data.

Even according to the third example embodiment, the intermediary device 1B can also suitably notify the owner terminal 2 of the information regarding the data customer who intends to purchase the data for sale provided by the owner terminal 2.

The whole or a part of the example embodiments described above (including modifications, the same applies hereinafter) can be described as, but not limited to, the following Supplementary Notes.

[Supplementary Note 1]

An intermediary device comprising:

an acquisition unit configured to acquire request information regarding a sale of data owned by a data owner from an owner terminal used by the data owner;

a determination unit configured to determine, on a basis of the request information, whether or not there is a customer who demands the data; and a notification unit configured to notify, in a case where the determination unit determines that there is the customer, the owner terminal of information regarding the customer.

[Supplementary Note 2]

The intermediary device according to Supplementary Note 1, wherein the determination unit determines, on a basis of customer information indicating the customer with respect to each data type, whether or not there is the customer corresponding to a type of the data.

[Supplementary Note 3]

The intermediary device according to Supplementary Note 1 or 2, wherein the information regarding the customer includes information indicative of a price which the customer desires or a recommended price.

[Supplementary Note 4]

The intermediary device according to any one of Supplementary Notes 1 to 3, wherein the information regarding the customer includes information regarding a task for which the customer uses the data.

[Supplementary Note 5]

The intermediary device according to Supplementary Note 4, wherein the information regarding the customer includes information regarding an effect to be made in a case where the customer performs the task by use of the data.

[Supplementary Note 6]

The intermediary device according to Supplementary Note 5, wherein the notification unit transmits display information as the information regarding the customer to the owner terminal, the display information being used for displaying a list of the customers in descending order of degree of the effect.

[Supplementary Note 7]

The intermediary device according to any one of Supplementary Notes 1 to 6, wherein the determination unit determines, on a basis of reliability information regarding reliability of the customer, whether or not the customer has an adequacy as a buyer of the data, and wherein the notification unit notifies the owner terminal of the information regarding the customer which is determined to have the adequacy.

[Supplementary Note 8]

The intermediary device according to any one of Supplementary Notes 1 to 7, wherein the determination unit determines, on a basis of interest relationship information regarding an interest relationship between the customer and the data owner, whether or not the customer has the adequacy as the buyer of the data, and wherein the notification unit notifies the owner terminal of the information regarding the customer which is determined to have the adequacy.

[Supplementary Note 9]

The intermediary device according to any one of Supplementary Notes 1 to 8, further comprising an inquiry unit configured to transmit inquiry information regarding a purchase of the data and receive response information as a response to the inquiry information, and wherein the determination unit make the determination based on the response information.

[Supplementary Note 10]

The intermediary device according to any one of Supplementary Notes 1 to 9, wherein the request information includes information indicative of an asking price of the data, and wherein the determination unit determines, on a basis of the information indicative of the asking price of the data, whether or not there is the customer who demands the data.

[Supplementary Note 11]

A control method executed by an intermediary device, the control method comprising:

acquiring request information regarding a sale of data owned by a data owner from an owner terminal used by the data owner;

determining, on a basis of the request information, whether or not there is a customer who demands the data; and notifying, in a case where it is determined that there is the customer, the owner terminal of information regarding the customer.

[Supplementary Note 12]

A storage medium storing a program executed by a computer, the program causing the computer to function as:

an acquisition unit configured to acquire request information regarding a sale of data owned by a data owner from an owner terminal used by the data owner;

a determination unit configured to determine, on a basis of the request information, whether or not there is a customer who demands the data; and a notification unit configured to notify, in a case where the determination unit determines that there is the customer, the owner terminal of information regarding the customer.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS 1, 1A, 1B Intermediary device
2 Owner terminal
3 Customer terminal
21, 31 Input unit
22, 32 Output unit
13, 23, 33 Storage unit
14, 24, 34 Communication unit
15, 25, 35 Control unit
100 Data market system

What is claimed is:

1. An intermediary device comprising:
a memory storing instructions; and
a processor configured to execute the instructions to:
acquire, from an owner terminal used by a data owner, request information regarding a sale of data owned by the data owner from an owner terminal used by the data owner;
determine, on a basis of the request information, a plurality of customers who have demanded the data to perform a respective plurality of tasks;
for each customer, calculate an accuracy improvement that results when the each customer performs a respective task using the data as compared to when the each customer performs the respective task without using the data; and
notify the owner terminal of information regarding the plurality of customers, including information regarding the respective plurality of tasks and, for each customer, information regarding the accuracy improvement that results when the each customer performs the respective task using the data,
wherein notification of the owner terminal of the information includes:
displaying a user interface including a list of the plurality of customers; and
displaying, for each customer, a user interface element in the user interface, the user interface element including:
an identification of the each customer, a price at which the each customer has offered for access to the data, and the effect that results when the each customer performs the respective task using the data; and
a selectable user interface element that is selectable by the data owner to initiate negotiation of the price with the each customer.

2. The intermediary device according to claim 1, wherein the processor determines the plurality of customers who have demanded the data on a further basis of customer information for each customer indicating the each customer in correspondence with to a type of the data.

3. The intermediary device according to claim 1, wherein the information regarding each customer includes information indicative of a price at which the each customer is willing to pay for the data or a recommended price.

4. The intermediary device according to claim 1, wherein displaying the list of the plurality of customers includes displaying the list in descending order of the accuracy improvement.

5. The intermediary device according to claim 1, wherein the processor determines, on a basis of reliability information regarding reliability of each customer, whether or not the each customer has adequacy to buy the data, and
wherein the information regarding the plurality of customers further includes information regarding which of the plurality of customers have the adequacy to buy the data.

6. The intermediary device according to claim 1, wherein the processor determines, on a basis of interest relationship information regarding an interest relationship between each customer and the data owner, whether or not the each customer has adequacy to buy the data, and
wherein the information regarding the plurality of customers further includes information regarding which of the plurality of customers have the adequacy to buy the data.

7. The intermediary device according to claim 1, wherein the processor is further configured to execute the instructions to
transmit inquiry information regarding a purchase of the data and receive response information as a response to the inquiry information, and
wherein the processor determines the plurality of customers based further on the response information.

8. The intermediary device according to claim 1,
wherein the request information includes information indicative of an asking price of the data, and
wherein the processor determines the plurality of customers who have demanded the data on a further basis of the information indicative of the asking price of the data.

9. A control method performed by an intermediary device and comprising:
acquiring, from an owner terminal used by a data owner, request information regarding a sale of data owned by the data owner from an owner terminal used by the data owner;
determining, on a basis of the request information, a plurality of customers who have demanded the data to perform a respective plurality of tasks;
for each customer, calculate an accuracy improvement that results when the each customer performs a respective task using the data as compared to when the each customer performs the respective task without using the data; and
notifying the owner terminal of information regarding the plurality of customers, including information regarding the respective plurality of tasks and, for each customer, information regarding the accuracy improvement that results when the each customer performs the respective task using the data,
wherein notification of the owner terminal of the information includes:
displaying a user interface including a list of the plurality of customers; and
displaying, for each customer, a user interface element in the user interface, the user interface element including:
an identification of the each customer, a price at which the each customer has offered for access to the data, and the effect that results when the each customer performs the respective task using the data; and a selectable user interface element that is selectable by the data owner to initiate negotiation of the price with the each customer.

10. A non-transitory computer-readable storage medium storing a program executed by a computer to:
acquire, from an owner terminal used by a data owner, request information regarding a sale of data owned by the data owner from an owner terminal used by the data owner;
determine, on a basis of the request information, a plurality of customers who have demanded the data to perform a respective plurality of tasks;
for each customer, calculate an accuracy improvement that results when the each customer performs a respective task using the data as compared to when the each customer performs the respective task without using the data; and
notify the owner terminal of information regarding the plurality of customers, including information regarding the respective plurality of tasks and, for each customer, information regarding the accuracy improvement that results when the each customer performs the respective task using the data,
wherein notification of the owner terminal of the information includes:
displaying a user interface including a list of the plurality of customers; and
displaying, for each customer, a user interface element in the user interface, the user interface element including:
an identification of the each customer, a price at which the each customer has offered for access to the data, and the effect that results when the each customer performs the respective task using the data; and
a selectable user interface element that is selectable by the data owner to initiate negotiation of the price with the each customer.

* * * * *